US012786868B2

(12) United States Patent
Simlai et al.

(10) Patent No.: US 12,786,868 B2
(45) Date of Patent: Nov. 3, 2026

(54) CLOSED LOOP MACHINE LEARNING BASED POWER OPTIMIZATION TECHNIQUES

(71) Applicant: Google LLC, Mountain View, CA (US)

(72) Inventors: Ananya Simlai, London (GB); Rittwik Jana, Montville, NJ (US); Ian Kenneth Coolidge, San Diego, CA (US); Santanu Dasgupta, Fremont, CA (US)

(73) Assignee: Google LLC, Mountain View, CA (US)

( * ) Notice: Subject to any disclaimer, the term of this patent is extended or adjusted under 35 U.S.C. 154(b) by 314 days.

(21) Appl. No.: 18/381,367

(22) Filed: Oct. 18, 2023

(65) Prior Publication Data

US 2025/0133491 A1 Apr. 24, 2025

(51) Int. Cl.
*H04W 52/02* (2009.01)

(52) U.S. Cl.
CPC ................................ *H04W 52/0203* (2013.01)

(58) Field of Classification Search
CPC ......... G06F 9/50; G06F 9/5094; G06N 20/00; G06N 3/02; H04W 52/0203
See application file for complete search history.

(56) References Cited

U.S. PATENT DOCUMENTS 12,461,582 B1 * 11/2025 Chaouat ................ G06F 1/3296
2017/0205863 A1 * 7/2017 Lee ....................... G06F 1/3206
2021/0406085 A1 * 12/2021 Vijayaraghavan ..... G06N 3/044
2022/0390480 A1 * 12/2022 Tran .......................... G01P 3/00
2023/0217253 A1 * 7/2023 Palermo .............. H04W 12/125 726/23
2024/0284298 A1 * 8/2024 Yang ..................... H04W 76/18
2024/0378486 A1 * 11/2024 Gad ........................ H04L 63/08
2024/0378506 A1 * 11/2024 D'Oro .................... G06N 20/00

FOREIGN PATENT DOCUMENTS

WO WO-2023167616 A1 * 9/2023 ............. G06F 1/324

OTHER PUBLICATIONS

International Search Report and Written Opinion for International Application No. PCT/US2024/042393 dated Feb. 4, 2025. 12 pages.
Boutaba et al. AI-driven Closed-loop Automation in 5G and beyond Mobile Networks. Network Flexibility and Agility (FlexNets'21), Aug. 27, 2021, Virtual Event, USA. ACM, New York, NY, USA, 6 pages.

* cited by examiner

*Primary Examiner* — Awet Haile
(74) *Attorney, Agent, or Firm* — Lerner David LLP

(57) ABSTRACT

Aspects of the disclosure are directed to network optimization of various workload servers running in a distributed cloud platform through closed loop machine learning inferencing performed locally on the workload servers. The workload servers can each be equipped with one or more machine learning accelerators to respectively perform local predictions for the workload servers. In response to the local predictions, attributes of the workload servers can be adjusted automatically for optimizing the network.

20 Claims, 6 Drawing Sheets

CLOSED LOOP MACHINE LEARNING BASED POWER OPTIMIZATION TECHNIQUES

BACKGROUND

Machine learning based closed loop inferencing refers to a continuous feedback mechanism based on one or more machine learning models. The machine learning models continuously monitor one or more metrics, performing inferencing based on the one or more metrics, and automatically perform updates or adjustments in response to the inferencing. A feedback loop of monitoring, inferencing, and adjusting can occur automatically to self-regulate, maintain stability, and/or achieve a desired outcome. However, machine learning based closed loop inferencing typically occurs in a centralized manner, using a dedicated server located separately from servers performing workloads, which can significantly slow down processing. For example, centralized closed loop inferencing may not be able to cater to latency sensitive workloads, such as radio resource management (RRM), that require sub-millisecond to tens of millisecond decision time, for instance to schedule cell resources based on predicted user handoffs from neighbor cells to serving cells.

BRIEF SUMMARY

Aspects of the disclosure are directed to network optimization of various workload servers running in a distributed cloud platform through closed loop machine learning inferencing performed locally on the workload servers. The workload servers can each be equipped with one or more machine learning accelerators to respectively perform local predictions for the workload servers. In response to the local predictions, attributes of the workload servers, like power usage, can be adjusted automatically for optimizing the network. The implementation of local machine learning accelerators in each workload server of the distributed cloud platform can reduce response time for adjusting the attributes, resulting in significant savings in latency, particularly for latency sensitive workloads that may not tolerate the latency from centralized closed loop inferencing.

An aspect of the disclosure provides for a method for managing one or more local processing units in a server computing device of a distributed cloud platform, the method including: receiving, by one or more processors, one or more metrics associated with the one or more local processing units for performing a workload; generating, by the one or more processors, one or more predictions for one or more states of the one or more local processing units based on the one or more metrics using a machine learning model deployed on one or more accelerators in the server computing device; and adjusting, by the one or more processing units, the one or more states of the one or more local processing units based on the predictions.

In an example, the one or more metrics include at least one of power utilization per processing unit core, power consumption per application running on a processing unit core, number of processing unit core C-states enabled, number of processing unit core P-states enabled, or number of instructions per cycle a processing unit is processing. In another example, the one or more local processing units include at least one of central processing units (CPUs), graphic processing units (GPUs), or field-programmable gate arrays (FPGAs). In yet another example, the one or more accelerators comprise at least one of tensor processing units (TPUs) or wafer scale engines (WSEs).

In yet another example, the method further includes training, by the one or more processors, the machine learning model locally in the server computing device using the one or more metrics. In yet another example, the method further includes receiving, by the one or more processors, the machine learning model, the machine learning model being pretrained externally on a disaggregated service management and orchestration (SMO) platform.

In yet another example, adjusting the one or more states includes adjusting at least one of frequency, voltage, power, C-states, P-states, or sleep states of the one or more local processing units. In yet another example, adjusting the one or more states includes adjusting the one or more states of a group of the one or more local processing units. In yet another example, the workload includes at least one of radio access network (RAN) functions, access and mobility management functions (AMF), user plane functions (UPF), or session management functions (SMF).

Another aspect of the disclosure provides for a system including: one or more processors; and one or more storage devices coupled to the one or more processors and storing instructions that, when executed by the one or more processors, cause the one or more processors to perform operations for managing one or more local processing units in a server computing device of a distributed cloud platform, the operations including: receiving one or more metrics associated with the one or more local processing units for performing a workload; generating one or more predictions for one or more states of the one or more local processing units based on the one or more metrics using a machine learning model deployed on one or more accelerators in the server computing device; and adjusting the one or more states of the one or more local processing units based on the predictions.

In an example, the one or more metrics include at least one of power utilization per processing unit core, power consumption per application running on a processing unit core, number of processing unit core C-states enabled, number of processing unit core P-states enabled, or number of instructions per cycle a processing unit is processing. In another example, the one or more local processing units include at least one of central processing units (CPUs), graphic processing units (GPUs), or field-programmable gate arrays (FPGAs). In yet another example, the one or more accelerators include at least one of tensor processing units (TPUs) or wafer scale engines (WSEs).

In yet another example, the operations further include training the machine learning model locally in the server computing device using the one or more metrics. In yet another example, the operations further include receiving the machine learning model, the machine learning model being pretrained externally on a disaggregated service management and orchestration (SMO) platform.

In yet another example, adjusting the one or more states includes adjusting at least one of frequency, voltage, power, C-states, P-states, or sleep states of the one or more local processing units. In yet another example, adjusting the one or more states comprises adjusting the one or more states of a group of the one or more local processing units. In yet another example, the workload includes at least one of radio access network (RAN) functions, access and mobility management functions (AMF), user plane functions (UPF), or session management functions (SMF).

Yet another aspect of the disclosure provides for a non-transitory computer readable medium for storing instructions that, when executed by one or more processors, cause the one or more processors to perform operations for managing one or more local processing units in a server computing device of a distributed cloud platform, the operations including: receiving one or more metrics associated with the one or more local processing units for performing a workload; generating one or more predictions for one or more states of the one or more local processing units based on the one or more metrics using a machine learning model deployed on one or more accelerators in the server computing device; and adjusting the one or more states of the one or more local processing units based on the predictions.

In an example, the operations further comprise training the machine learning model locally in the server computing device using the one or more metrics.

DETAILED DESCRIPTION

Figure 1A:
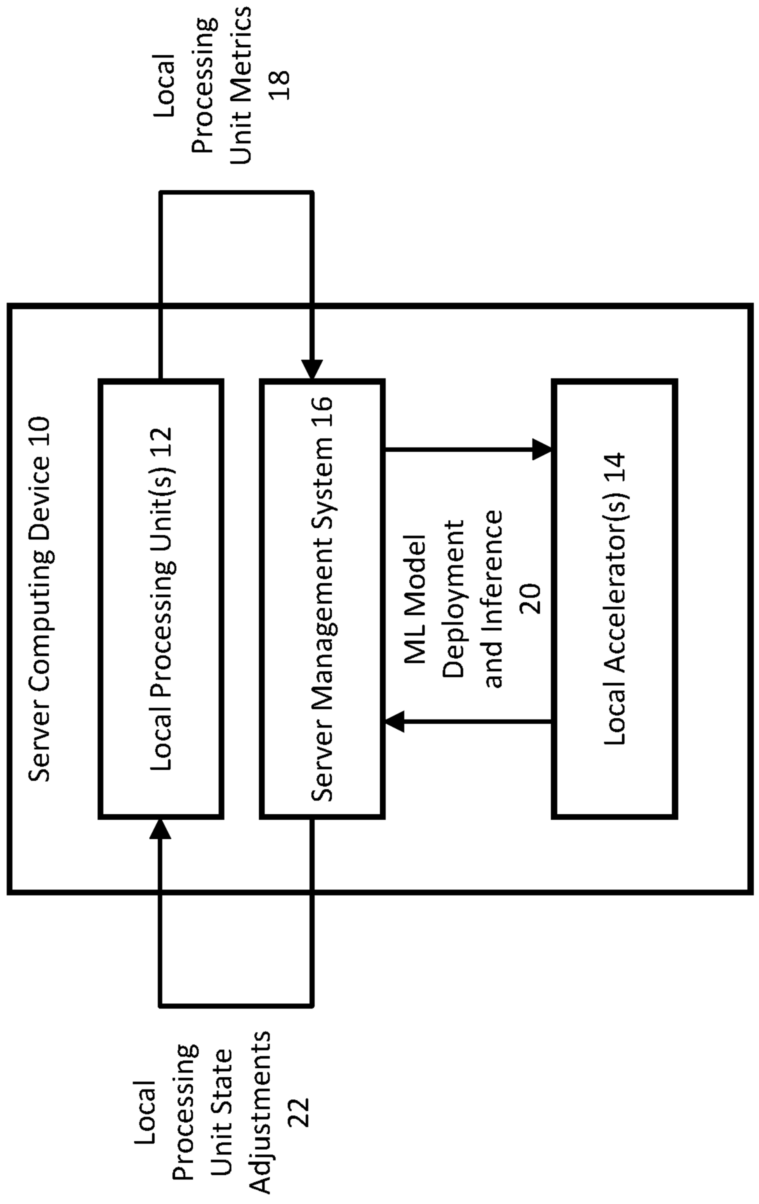
FIG. 1A depicts a block diagram of an example server computing device implementing local closed loop machine learning inference according to aspects of the disclosure.

The technology relates generally to closed loop machine learning based power optimization techniques for distributed cloud platforms. Power settings for a distributed cloud platform can be predicted based on one or more local machine learning accelerator chips in each distributed cloud platform server.

The cloud platform servers can each include a power manager and a metrics collector. The power manager can include a P-manager and a C-manager to perform power control tasks by respectively altering P-states and/or C-states of individual processors. The metrics collector can derive one or more metrics, such as per processor, from the processors based on the power control tasks and stream the metrics upstream to other servers in the distributed cloud platform. Example metrics can include power utilization per processor core, power consumption per application running on a processor core, number of processor core C-states enabled, and/or number of instructions per cycle a processor is processing. The power manager can statically adjust power consumption by attaching a power profile to individual processors or a group of processors selected by a scheduler for running an application. The power profile can be derived by a prediction engine based on the one or more metrics collected by the metrics collector. The power profile can include one or more states for the individual processors or group of processors, such as frequency, voltage, and/or sleep states. The power manager can further dynamically adjust power consumption of the individual processors or a group of processors by scheduling shared processors using the prediction engine based on the one or more metrics. The scheduling of shared processors can include scheduling processors from a reserved pool of processors and/or a fractional pool of processors. The power manager can also dynamically adjust power consumption by deriving insights and patterns based on the one or more metrics to dynamically change power and sleep settings of the individual processors or a group of processors.

Based on the insights and predictions, the power manager can dynamically adjust power control of local processors as well, allowing for the prediction of power settings based on the local processors for each cloud platform server. This would remove the need for a centralized control loop in a large scale network, which can delay decision making and leverages a distributed decision regardless of particular servers. This would further allow for prediction of power settings where a centralized control loop is unavailable, such as due to resource constraints.

A cloud platform server of the distributed cloud platform includes one or more local power manager processors, such as TPUs, GPUs, and/or CPUs, on board and used to leverage a local closed loop machine learning inference without involving control loops outside the cloud platform server. The local power manager processors can be associated with a controller and each be associated with a manager instance. The local power manager processors can access local processor metrics via the metrics collector. The controller can control inferencing via each local power manager processor based on trends from models trained on the local processor metrics. The manager instances can action the inferences made by the controller to control the power settings of the cloud platform server via frequency and sleep states of the local processors. The local power manager processors can exercise millisecond to microsecond level granularity in controlling the power settings.

The distributed cloud platform can include a disaggregated service management and orchestration (SMO) leveraged for power management of the cloud platform servers. The disaggregated SMO can include an AI/ML platform to perform machine learning model management, training, and/or life cycle management (LCM). The AI/ML platform can collect metric data from the cloud platform servers and perform model training using the metric data. The machine learning models can be trained per workload, such as per network function. Example network functions can include radio access network functions, such as virtualized distributed units (VDUs) and/or virtualized centralized units (VCUs), access and mobility management functions (AMF), user plane functions (UPF), and/or session management functions (SMF), though any workload can be used to train the machine learning models.

For example, VDU functions can be implemented as virtualized network functions (VNFs) or containerized network functions (CNFs), which are decoupled from underlying hardware and operate on a server. PHY and MAC layers can require high computational complexity, such as for channel estimation and detection, forward error correction (FEC), and/or scheduling algorithms, causing a high load on the computing power of the server and degrading the performance of the VDU. Some compute intensive tasks with repetitive structures, such as FEC, can be off-loaded to alternative hardware chips for acceleration installed on the server. The VDU can include multiple pods, including one or more containers compliant with a micro service type architecture. Server resources, such as the processor cores and memory, occupied by each pod can vary significantly. Further, the pods can be scaled based on capacity requirements. This allows the VDU to be configured with appropriate processor cores and memory dimensioning using a trained machine learning model according to capacity and performance requirements in specific network deployments. The management and orchestration of VDU containers can be supported by a system that automatically distributes, scales, and manages containerized applications, such as using a trained machine learning model.

The AI/ML platform can include a catalog to publish trained machine learning models for downloading to each cloud platform server. Alternatively, or additionally, each cloud platform server can include a training platform for model training using the metric data of that cloud platform server. Each cloud platform server can further include an inference platform working in coordination with the manager instances. Each cloud platform server can include one or more workloads tied to a specific local processor. The machine learning models, trained per workload, can predict one or more states of the local processors, such as frequency, voltage, and/or sleep states. Using the machine learning model prediction, the manager instances and controller can provide instructions to the power manager, e.g., C-manager and/or P-manager, to configure the one or more states of the local processors.

FIG. 1A depicts a block diagram of an example server computing device 10 implementing local closed loop machine learning inference. For example, the server computing device 10 can be an edge device that provides an entry point into a distributed cloud platform. Example edge devices can include routers, switches, or other access devices. The server computing device 10 can include one or more local processing units 12, one or more local accelerators 14, and a server management system 16. The server management system 16 can receive one or more metrics 18 associated with the local processing units 12. Based on the metrics 18, the server management system 16 can deploy one or more machine learning models to generate inference 20 about the performance of the local processing units 12 using the local accelerators 14. In response to the inference 20, the server management system 16 can adjust one or more states 20 of the local processing units 12. The server management system 16 can receive the metrics 18, generate inference 20, and adjust the states 20 iteratively, representing a closed loop within the server computing device 10 for optimizing performance of the local processing units 12.

Figure 1B:
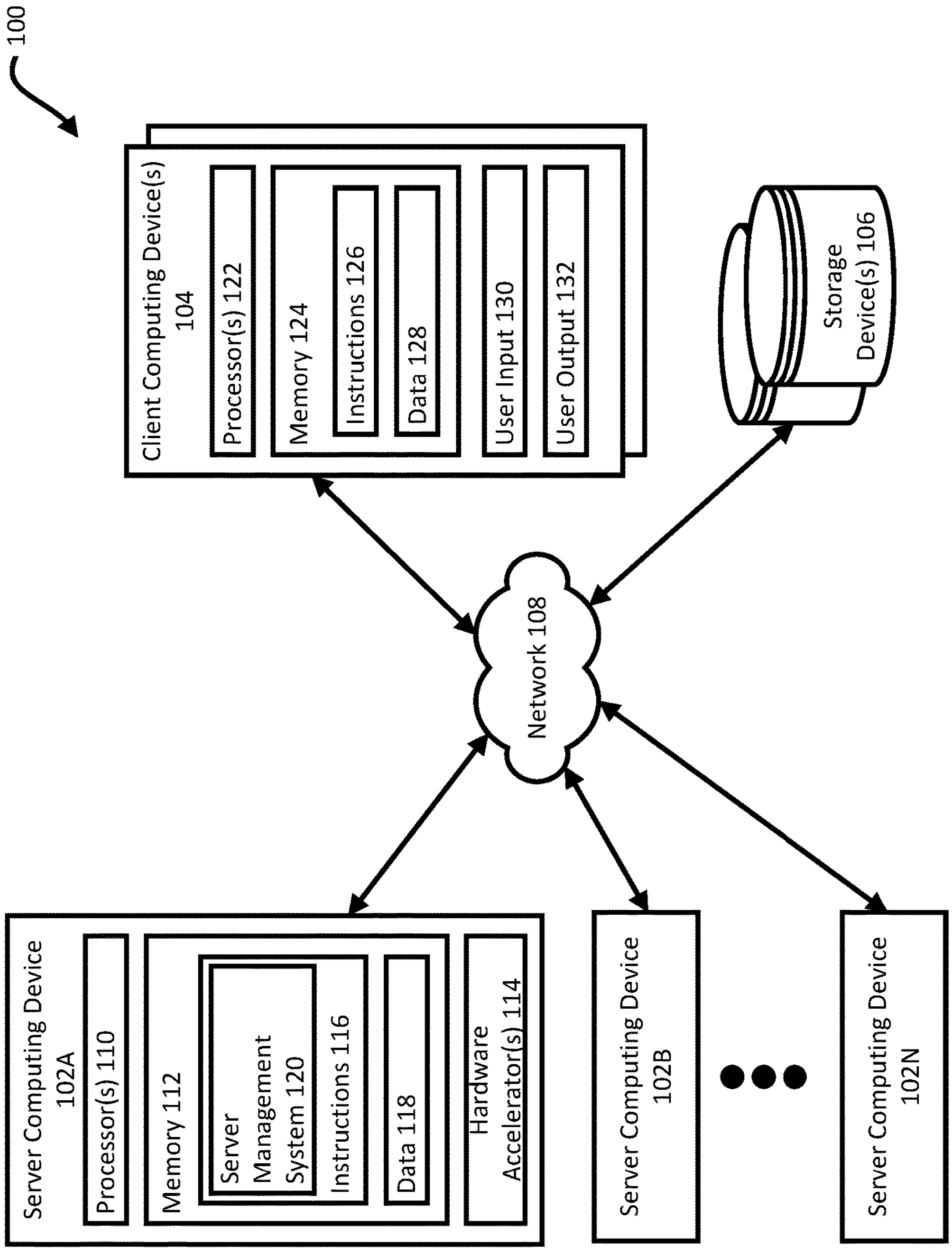
FIG. 1B depicts a block diagram of an example environment to implement local closed loop machine learning inference for a distributed cloud platform according to aspects of the disclosure.

FIG. 1B depicts a block diagram of an example environment 100 to implement local closed loop machine learning inference for a distributed cloud platform. The distributed cloud platform can provide for services that allow for provisioning or maintaining compute resources and/or applications, such as for data centers, cloud environments, and/or container frameworks. For example, the cloud-based platform can be used as a service that provides software applications, such as communication services, accounting, word processing, inventory tracking, etc. As another example, the infrastructure of the platforms can be partitioned in the form of virtual machines or containers on which software applications are run.

The distributed cloud platform can be implemented on one or more devices having one or more processors in one or more locations, such as in a plurality of server computing devices 102A-N and one or more client computing devices 104. Any of the plurality of server computing devices 102 can correspond to the server computing device 10 as depicted in FIG. 1A. The plurality of server computing devices 102 and the client computing device 104 can be communicatively coupled to one or more storage devices 106 over a network 108. The storage devices 106 can be a combination of volatile and non-volatile memory and can be at the same or different physical locations than the computing devices 102, 104. For example, the storage devices 106 can include any type of non-transitory computer readable medium capable of storing information, such as a hard-drive, solid state drive, tape drive, optical storage, memory card, ROM, RAM, DVD, CD-ROM, write-capable, and read-only memories.

The server computing devices 102 can each include one or more processors 110, memory 112, and hardware accelerators 114. The processors 110 can be specified for performing one or more workloads for services provided by the distributed cloud platform. The accelerators 114 can be specified for deploying one or more machine learning models, such as for predicting processor states like frequency, voltage, and/or sleep states. Example processors 110 can include central processing units (CPUs), graphic processing units (GPUs), and/or field-programmable gate arrays (FPGAs). Example accelerators 114 can also include GPUs and/or FPGAs as well as application-specific integrated circuits (ASICs), such as tensor processing units (TPUs) or wafer scale engines (WSEs).

The memory 112 can store information accessible by the processors 110 and/or accelerators 114, including instructions 116 that can be executed by the processors 110 and/or accelerators 114. The memory 112 can also include data 118 that can be retrieved, manipulated, or stored by the processors 110 and/or accelerators 114. The memory 112 can be any type of transitory or non-transitory computer readable medium capable of storing information accessible by the processors 110 and/or accelerators 114, such as volatile or non-volatile memory. Example memory 112 can include high bandwidth memory (HBM), static random access memory (SRAM), dynamic random access memory (DRAM), synchronous dynamic random access memory (SDRAM), flash memory, and/or read only memory (ROM).

The instructions 116 can include one or more instructions that, when executed by the processors 110 and/or accelerators 114, cause the one or more processors 110 and/or accelerators 114 to perform actions defined by the instructions 116. The instructions 116 can be stored in object code format for direct processing by the processors 110 and/or accelerators 114, or in other formats including interpretable scripts or collections of independent source code modules that are interpreted on demand or compiled in advance. The instructions 116 can include instructions for implementing a server management system 120, to be described further below. The server management system 120 can be executed using the processors 110 and/or accelerators 114, and/or using other processors and/or accelerators remotely located on other server computing devices.

The data 118 can be retrieved, stored, or modified by the processors 110 and/or accelerators 114 in accordance with the instructions 116. The data 118 can be stored in computer registers, in a relational or non-relational database as a table having a plurality of different fields and records, or as JSON, YAML, proto, or XML documents. The data 118 can also be formatted in a computer-readable format such as, but not limited to, binary values, ASCII, or Unicode. Moreover, the data 118 can include information sufficient to identify relevant information, such as numbers, descriptive text, proprietary codes, pointers, references to data stored in other memories, including other network locations, or information that is used by a function to calculate relevant data.

The client computing device 104 can be configured similarly to the server computing devices 102, with one or more processors 122, memory 124, instructions 126, and data 128. The client computing device 104 can also include a user input 130 and a user output 132. The user input 130 can include any appropriate mechanism or technique for receiving input from a user, such as keyboard, mouse, mechanical actuators, soft actuators, touchscreens, microphones, and sensors. The user output 132 can include any appropriate mechanism or technique for providing information to a platform user of the client computing device 104. For example, the user output 132 can include a display for displaying at least a portion of data received from one or more of the server computing devices 102. As another example, the user output 132 can include an interface between the client computing device 104 and one or more of the server computing devices 102. As yet another example, the user output 132 can include one or more speakers, transducers, or other audio outputs, or haptic interfaces or other tactile feedback that provides non-visual and non-audible information to the platform user of the client computing device 104.

Although FIG. 1B illustrates the processors 110, 122, the memories 112, 124, and the accelerators 114 as being within the respective computing devices 102, 104, components described herein can include multiple processors, memories, and accelerators that can operate in different physical locations and not within the same computing device. For example, some of the instructions 116, 126 and the data 118, 128 can be stored on a removable SD card and others within a read-only computer chip. Some or all of the instructions 116, 126 and data 118, 128 can be stored in a location physically remote from, yet still accessible by, the processors 110, 122 and/or accelerators 114. Similarly, the processors 110, 122 and/or accelerators 114 can include a collection of processors and/or accelerators that can perform concurrent and/or sequential operations. The computing devices 102, 104 can each include one or more internal clocks providing timing information, which can be used for time measurement for operations and programs run by the computing devices 102, 104.

One or more of the server computing devices 102 can be configured to receive requests to process data from the client computing device 104, such as part of a query for a particular task. The server computing devices 102 can receive the query, processor the query, and, in response, generate output data, such as a response to the query for the particular task. As the server computing device 102 is processing and responding to requests, the server management system 120 can monitor various metrics of the processors 110. The server management system 120 can continually or periodically input those metrics to a machine learning model deployed using the accelerators 114. The machine learning model can output one or more predictions associated with usage of the processors 110. Based on the one or more predictions, the server management system 120 can adjust various states of the processors 110, such as for optimizing power usage.

Figure 2:
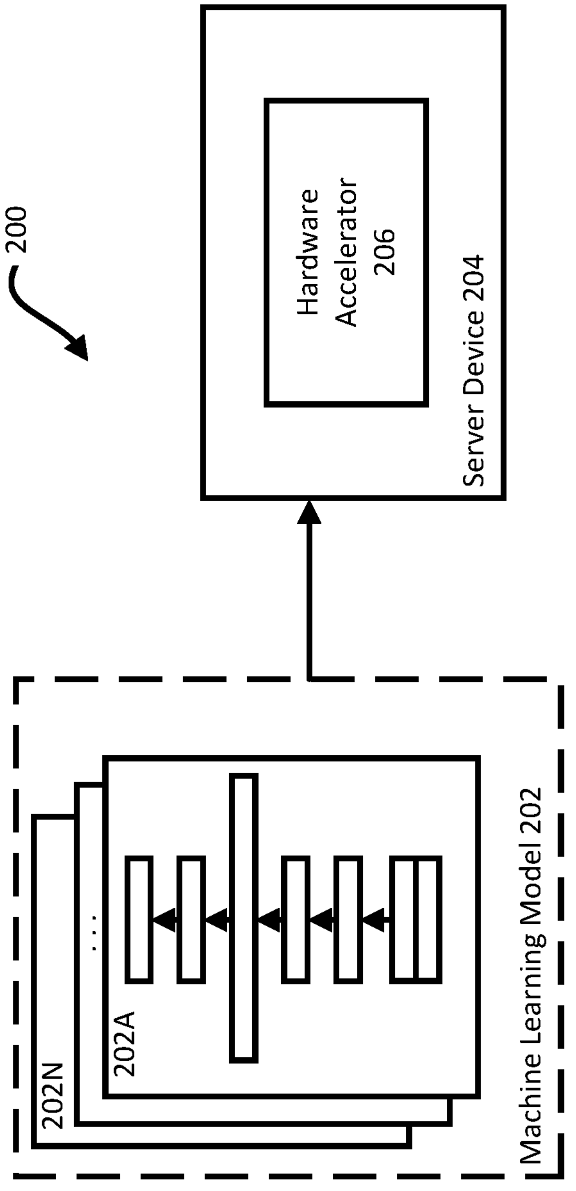
FIG. 2 depicts a block diagram illustrating one or more machine learning model architectures according to aspects of the disclosure.

FIG. 2 depicts a block diagram 200 illustrating one or more machine learning model architectures 202, more specifically 202A-N for each architecture, for deployment in a server computing device 204 housing one or more hardware accelerators 206 on which the deployed machine learning models 202 will execute. The server computing device 204 can correspond to any of the server computing devices 102 as depicted in FIG. 1B. The hardware accelerator 206 can be any type of processor, such as a CPU, GPU, FPGA, and/or ASIC, such as a TPU or WSE.

An architecture 202 of a machine learning model can refer to characteristics defining the model, such as characteristics of layers for the model, how the layers process input, or how the layers interact with one another. The architecture 202 of the machine learning model can also define types of operations performed within each layer. One or more machine learning model architectures 202 can be generated that can output results, such as for network optimization of a distributed cloud platform. Example model architectures 202 can correspond to predictive models such as classification models, clustering models, forecast models, outlier models, time series models, neural networks, decision trees, generalized linear models, and/or gradient boosted models.

Referring back to FIG. 1B, the devices 102, 104 can be capable of direct and indirect communication over the network 108. For example, using a network socket, the client computing device 104 can connect to a service operating using the server computing devices 102 through an Internet protocol. The devices 102, 104 can set up listening sockets that may accept an initiating connection for sending and receiving information. The network 108 can include various configurations and protocols including the Internet, World Wide Web, intranets, virtual private networks, wide area networks, local networks, and private networks using communication protocols proprietary to one or more companies. The network 108 can support a variety of short- and long-range connections. The short- and long-range connections may be made over different bandwidths, such as 2.402 GHZ to 2.480 GHz, commonly associated with the Bluetooth® standard, 2.4 GHz and 5 GHZ, commonly associated with the Wi-Fi® communication protocol; or with a variety of communication standards, such as the LTE® or 5G standard for wireless broadband communication. The network 108, in addition or alternatively, can also support wired connections between the devices 102, 104, including over various types of Ethernet connection.

Although three server computing devices 102, a client computing device 104, and a storage device 106 are shown in FIG. 1B, it is understood that the example environment 100 can be implemented according to any number of server computing devices 102, client computing device 104, and storage devices 106. The example environment 100 can be implemented according to a variety of different configurations and quantities of computing devices, including in paradigms for sequential or parallel processing, over a distributed network of multiple devices.

Figure 3:
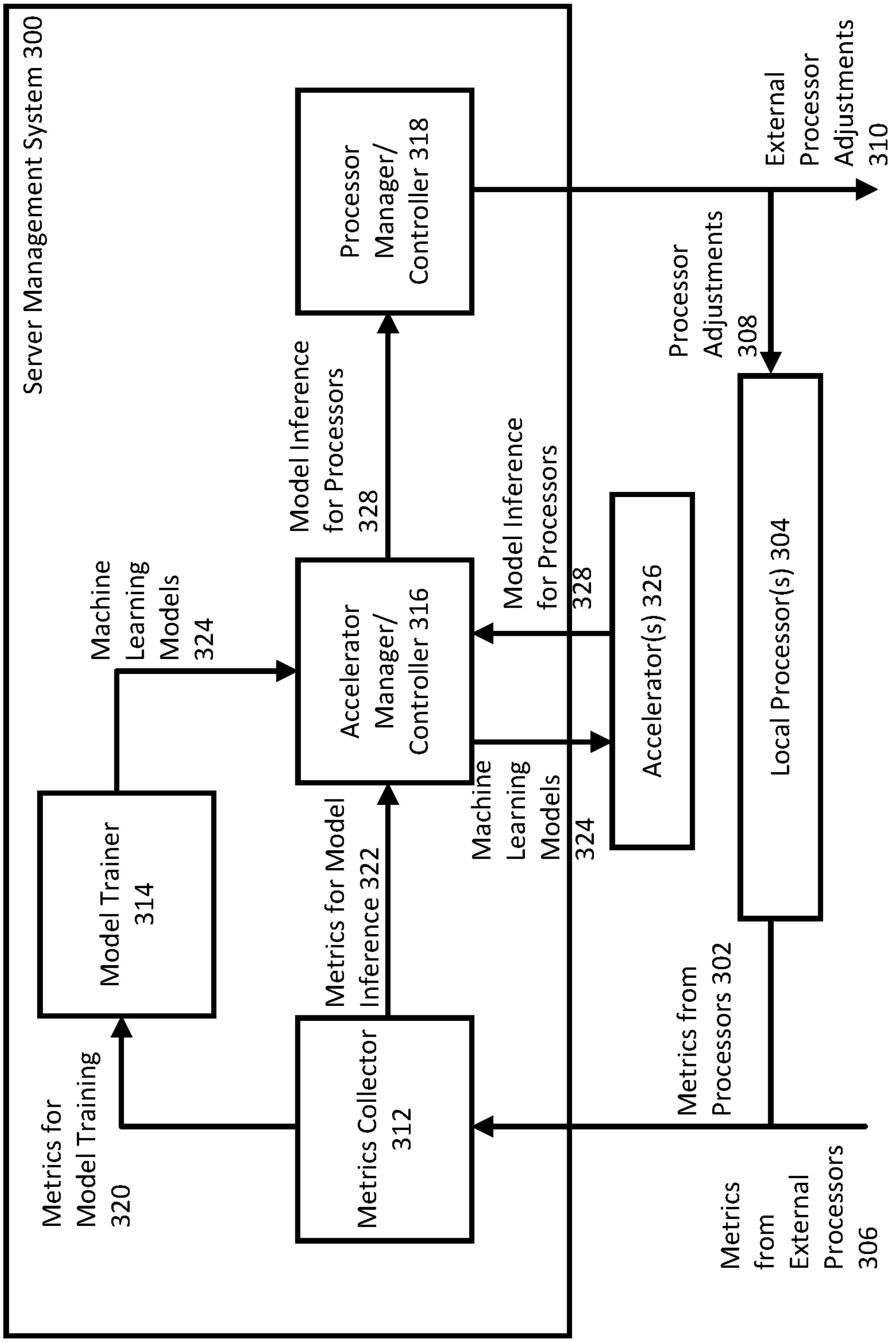
FIG. 3 depicts a block diagram of an example server management system that can perform local closed loop machine learning inference on one or more processors using locally trained machine learning models according to aspects of the disclosure.

FIG. 3 depicts a block diagram of an example server management system 300 that can perform local closed loop machine learning inference on one or more processors, such as for network optimization. The server management system 300 can be implemented on each of a plurality of server computing devices in a distributed cloud platform, such as the server computing devices 102 as depicted in FIG. 1B.

The server management system 300 can be configured to receive metric data 302 from one or more local processors 304. Processors that are local may refer to one or more processors located on the same server computing device as the server management system 300. The server management system 300 can further be configured to receive metric data 306 from one or more external processors (not shown). Processors that are external may refer to one or more processors located on other server computing devices than the server computing device containing the server management system 300, such as upstream or downstream server computing devices in the distributed cloud platform. Example metrics can include power utilization per processor core, power consumption per application running on a processor core, number of processor core C-states enabled, number of processor core P-states enabled, and/or number of instructions per cycle a processor is processing. The metric data 302, 306 can be per processor or for a group of processors.

The server management system 300 can receive the metric data 302, 306 as part of a call to an application programming interface (API) exposing the server management system 300 to one or more server computing devices. Example APIs can include remote procedure calls (RPCs) and/or representational state transfer (REST). The server management system 300 can also receive the metric data 302, 306 through a storage medium, such as remote storage connected to the server computing device containing the server management system 300. The server management system 300 can further receive the metric data 302, 306 through a user interface on a client computing device coupled to the server computing device over a network.

Based on the metric data 302, 306, the server management system 300 can be configured to output processor adjustment data 308 for adjusting one or more states of the local processors 104. The server management system 300 can be further configured to output external processor adjustment data 310 for adjusting one or more states of one or more external processors (not shown). Example states of the processors can include frequency amount, voltage amount, power amount, and/or whether a processor should be placed in a sleep or active state. The processor adjustment data 308, 310 can be per processor or for a group of processors.

The server management system 300 can be configured to provide the processor adjustment data 308, 310 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The server management system 300 can also forward the processor adjustment data 308, 310 to one or more other devices configured for translating the output data into an executable program written in a computer programming language. The server management system 300 can further be configured to send the processor adjustment data 308, 310 for display on a client device. The server management system 300 can also be configured to send the processor adjustment data 308, 310 to a storage device for storage and later retrieval.

The server management system 300 can include a metrics collector 312, a model trainer 314, an accelerator manager and/or controller 316, and a processor manager and/or controller 318. The metrics collector 312, model trainer 314, accelerator manager and/or controller 316, and processor manager and/or controller 318 can be implemented as one or more computer programs, specially configured electronic circuitry, or any combination thereof.

The metrics collector 312 can be configured to continually or periodically derive metrics about the local processors 304 and/or external processors. The metrics can be per processor or for a group of processors. Example metrics can include power utilization per processor core, power consumption per application running on a processor core, number of processor core C-states enabled, number of processor core P-states enabled, and/or number of instructions per cycle a processor is processing. As an example, the metrics collector 312 can organize the metrics into a tabular format where rows may denote each of the local processors 104 and columns may denote metrics describing the local processors 104. The metrics in the columns can be features on which the machine learning models are trained. The metrics collector 312 can further be configured to continually or periodically output the metrics as training data 320 for training one or more machine learning model and as inference data 322 for deployed machine learning models to perform inference. The metrics output as training data 320 and the metrics outputs as inference data 322 can be the same metric data or different metric data from the same or different local processors 304. The metrics collector 312 can also continually or periodically output the metrics for storage in a database.

The model trainer 314 can be configured to train one or more machine learning models 324 for performing local closed loop machine learning inference on the local processors 304, such as for network optimization. The machine learning models 324 can be trained per workload, such as per network function or per service provided by the distributed cloud platform. Example network functions can include radio access network functions, such as virtualized distributed units (VDUs) and/or virtualized centralized units (VCUs), access and mobility management functions (AMF), user plane functions (UPF), and/or session management functions (SMF), though any workload or service can be used as context to train the machine learning models. The model trainer 314 can train the machine learning models 324 using the metrics received by the metrics collector 312. The model trainer 314 can provide trained machine learning models 324 to the accelerator manager and/or controller 316.

The machine learning models 324 can be trained according to one of a variety of different learning techniques. Learning techniques for training the model can include supervised learning, unsupervised learning, semi-supervised learning, and/or reinforcement learning techniques. Training data can include multiple training examples that can be received as input by the machine learning models 324. The training examples can be labeled with a desired output for the machine learning models 324 when processing the labeled training examples. The label and the model output can be evaluated through a loss function to determine an error, which can be back propagated through the machine learning models 324 to update weights for the machine learning models. For example, a supervised learning technique can be applied to calculate an error between outputs, with a ground-truth label of a training example processed by the machine learning models 324. Any of a variety of loss or error functions can be utilized, such as cross-entropy loss for classification tasks, or mean square error for regression tasks. The gradient of the error with respect to the different weights of the candidate model on candidate hardware can be calculated, for example using a backpropagation algorithm, and the weights for the machine learning model can be updated. The machine learning models 324 can be trained until stopping criteria are met, such as a number of iterations for training, a maximum period of time, a convergence, or when a minimum accuracy threshold is met. The machine learning models 324 can further be trained with regularization, data augmentation, and/or early stopping to prevent overfitting and improve generalization capabilities of the machine learning models 324.

The accelerator manager and/or controller 316 can be configured to deploy the machine learning models 324*s* on the local accelerators 326 in the server computing device. The accelerator manager and/or controller 316 can configure the machine learning models 324 to perform model inference 328, e.g., determine predictions, patterns, and/or trends, in the performance of the local processors 304 using metrics 322 from the metrics collector 312. For example, the accelerator manager and/or controller 316 can be configured to deploy one or more machine learning models 324 on the local accelerators 326 to determine C-states, P-states, frequency, and/or voltage settings per local processor 304 or per a group of the local processors 304. The machine learning models 324 can output these settings along with confidence scores indicating how confident the machine learning models 324 are in the accuracy of these settings. The model inference 328 determined by the machine learning models 324 using the local accelerators 326 can be output back to the accelerator manager and/or controller 316 to then be sent to the processor manager and/or controller 318. Alternatively, or additionally, the model inference 328 determined by the machine learning models 324 can be output directly to the processor manager and/or controller 318.

The processor manager and/or controller 318 can be configured to adjust one or more settings or states of one or more of the local processors 304 based on the model inference 328 determined by the machine learning models 324. The processor manager and/or controller 318 can include one or more sub-controllers particular to a processor setting, such as a P-state controller, C-state controller, and/or power controller, for controlling individual settings or states of the local processors 304. The processor manager and/or controller 318 can alter the settings or state per processor or per a group of processors. The processor manager and/or controller 318 can also provide instructions to alter the settings or states of external processors based on the model inference 328. Example settings or states that can be altered include frequency, voltage, power, C-states, P-states, and/or sleep states of the local processors 304.

Figure 4:
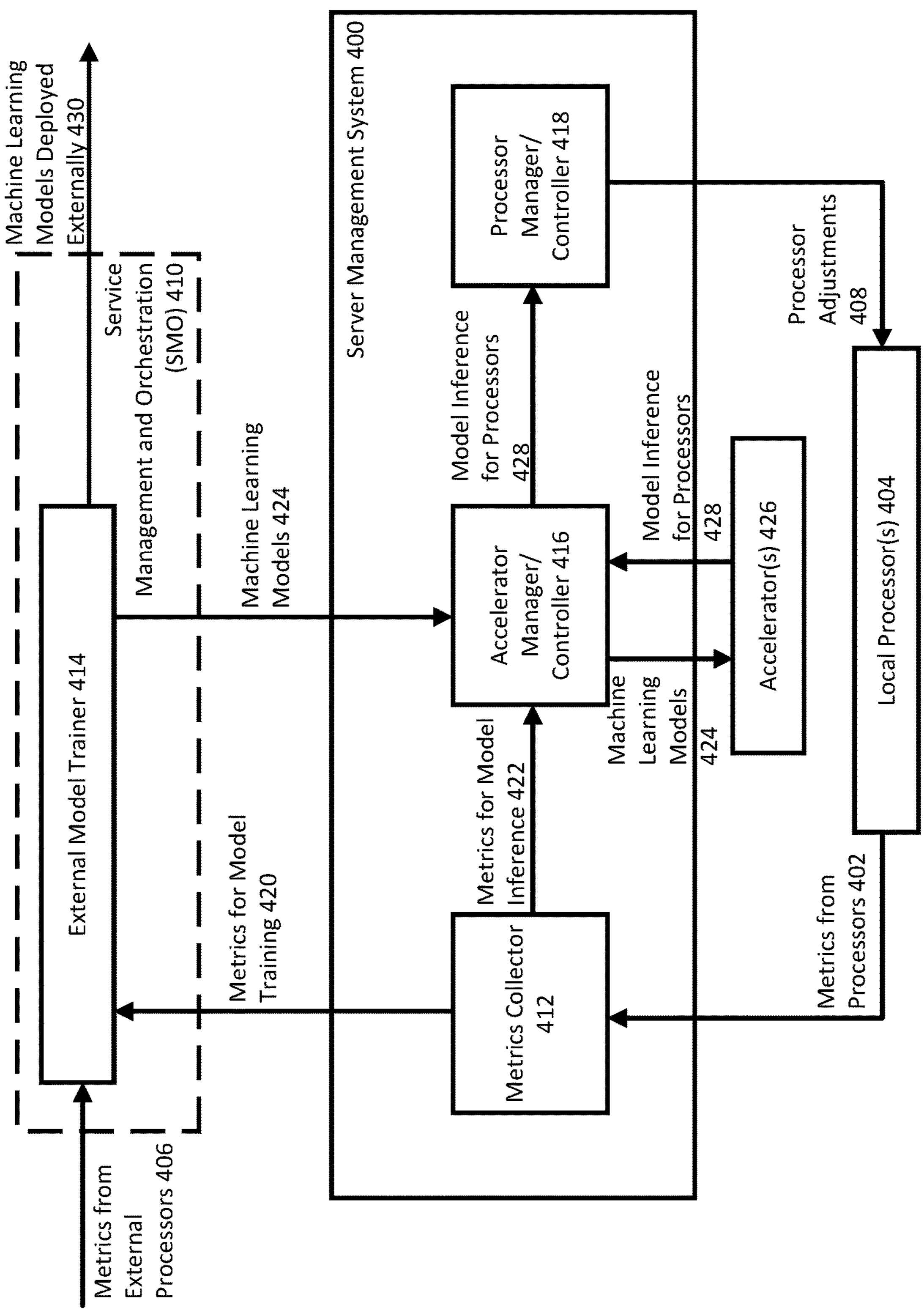
FIG. 4 depicts a block diagram of an example server management system that can perform local closed loop machine learning inference on one or more processors using externally trained machine learning models according to aspects of the disclosure.

FIG. 4 depicts a block diagram of an example server management system 400 that can perform local closed loop machine learning inference on one or more processors, such as for network optimization. The server management system 400 in FIG. 4 can be configured similarly to the server management system 300 as depicted in FIG. 3 with corresponding elements such as the metrics collector 412, accelerator manager and/or controller 416, and processor manager and/or controller 418.

The server management system 400 can be configured to receive metric data 402 from one or more local processors 404. Based on the metric data 402, the server management system 400 can be configured to output processor adjustment data 408 for adjusting one or more states of the local processors 404. The metrics collector 412 can be configured to continually or periodically derive metrics about the local processors 404 and output the metrics for model inference 422 to the accelerator manager and/or controller 416. The accelerator manager and/or controller 416 can be configured to deploy the machine learning models 424*s* on the local accelerators 426 to perform model inference 428 on one or more states or settings of the local processors 404. The accelerator manager and/or controller 416 can output the model inference 428 to the processor manager and/or controller 418 to perform processor adjustments 408 to one or more states or settings of the local processors 404.

The machine learning models 424 deployed by the server management system 400 may be trained externally on one or more other server computing devices than the server computing device containing the server management system 400. For example, the distributed cloud platform may include a disaggregated service management and orchestration (SMO) 410 leveraged for management of the server computing devices. The SMO 410 can include an external model trainer 414 as a dedicated platform to perform machine learning management, training, and/or life cycle management. The external model trainer 414 can train one or more machine learning models 424 for deployment on the server management system 400 as well as other machine learning models 430 for deployment to other server management systems on other server computing devices. The external model trainer 414 can train the machine learning models using metrics 420 from the metrics collector 412 as well as metrics 406 from metrics collectors of the other server management systems. The machine learning models 424 can be trained according to one of a variety of different learning techniques, such as supervised learning, unsupervised learning, semi-supervised learning, and/or reinforcement learning techniques.

Implementing an external model trainer 414 may increase overall accuracy of the machine learning models 424 being deployed, as the external model trainer 414 can train the machine learning models 424 with more data from numerous metrics collectors of the various server computing devices in the distributed cloud platform. Implementing the external model trainer 414 may also speed up training due to the greater number of accelerators available for training the machine learning models 424.

Figure 5:
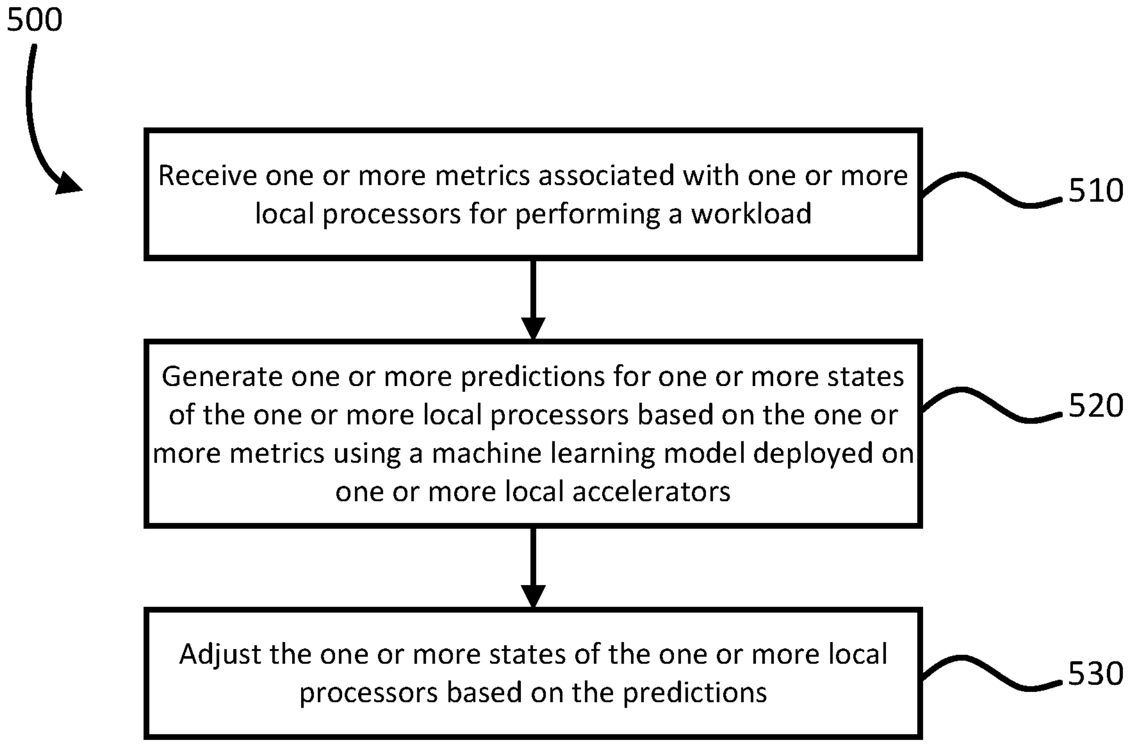
FIG. 5 depicts a flow diagram of an example process for performing local closed loop machine learning inference to manage one or more local processors using local accelerators according to aspects of the disclosure.

FIG. 5 depicts a flow diagram of an example process 500 for performing local closed loop machine learning inference to manage one or more local processors using local accelerators. The example process 500 can be performed on a system of one or more processors and/or accelerators on a server computing device of a distributed cloud platform, such as the server management system 300 or server management system 400 as respectively depicted in FIG. 3 and FIG. 4.

As shown in block 510, the server management system 300 or 400 can receive one or more metrics associated with the one or more local processors. The metrics can be per workload, such as per network function. Example workloads can include radio access network (RAN) functions, access and mobility management functions (AMF), user plane functions (UPF), and/or session management functions (SMF). The one or more metrics can include power utilization per processor core, power consumption per application running on a processor core, number of processor core C-states enabled, number of processor core P-states enabled, and/or number of instructions per cycle a processor is processing, as examples. The one or more local processors can include CPUs, GPUs, and/or FPGAs, as examples.

As shown in block 520, the server management system 300 or 400 can generate one or more predictions for one or more states of the one or more local processors based on the one or more metrics. The server management system 300 or 400 can generate the predictions using a machine learning model deployed on one or more accelerators in the server computing device. The one or more accelerators can include TPUs and/or WSEs, as examples. The machine learning model can be trained locally in the server computing device or pretrained externally one or more other server computing devices, such as through an SMO platform. The machine learning model can be trained using the one or more metrics and/or one or more metrics from external processors on other server computing devices.

As shown in block 530, the server management system 300 or 400 can adjust the one or more states of the one or more local processors based on the predictions. Adjusting the one or more states can further include adjusting a frequency, voltage, power, C-state, P-state, or sleep state of the one or more local processors. Adjusting the one or more states can further include adjusting the one or more states of a group of the one or more local processors or of a single local processor.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for managing one or more local processing units in a server computing device of a distributed cloud platform, the method comprising:

- receiving, by one or more processors, one or more metrics associated with respective states of the one or more local processing units for performing a workload;
- deploying, by the one or more processors, a machine learning model based on the workload on one or more local accelerators in the server computing device containing the one or more local processing units to generate one or more predictions for the respective states of the one or more local processing units;
- receiving, by the one or more processors, the one or more predictions from the one or more local accelerators; and
- adjusting, by the one or more processors, the respective states of the one or more local processing units based on the predictions to perform the workload.

2. The method of claim 1, wherein the one or more metrics comprise at least one of power utilization per processing unit core, power consumption per application running on a processing unit core, number of processing unit core C-states enabled, number of processing unit core P-states enabled, or number of instructions per cycle a processing unit is processing.

3. The method of claim 1, wherein the one or more local processing units comprise at least one of central processing units (CPUs), graphic processing units (GPUs), or field-programmable gate arrays (FPGAs).

4. The method of claim 1, wherein the one or more accelerators comprise application-specific integrated circuits (ASICs).

5. The method of claim 1, further comprising training, by the one or more processors, the machine learning model locally in the same server computing device as the one or more local processing units based on the one or more metrics.

6. The method of claim 1, further comprising receiving, by the one or more processors, the machine learning model, the machine learning model being pretrained externally on a disaggregated service management and orchestration (SMO) platform.

7. The method of claim 1, wherein adjusting the respective states comprises adjusting at least one of frequency, voltage, power, C-states, P-states, or sleep states of the one or more local processing units.

8. The method of claim 1, wherein adjusting the respective states comprises adjusting the one or more states of a group of the one or more local processing units.

9. The method of claim 1, wherein the workload comprises at least one of radio access network (RAN) functions, access and mobility management functions (AMF), user plane functions (UPF), or session management functions (SMF).

10. A system comprising:

one or more processors; and one or more storage devices coupled to the one or more processors and storing instructions that, when executed by the one or more processors, cause the one or more processors to perform operations for managing one or more local processing units in a server computing device of a distributed cloud platform, the operations comprising:

- receiving one or more metrics associated with respective states of the one or more local processing units for performing a workload;
- deploying a machine learning model based on the workload on one or more local accelerators in the server computing device containing the one or more local processing units to generate one or more predictions for the respective states of the one or more local processing units;
- receiving the one or more predictions from the one or more local accelerators; and
- adjusting the respective states of the one or more local processing units based on the predictions to perform the workload.

11. The system of claim 10, wherein the one or more metrics comprise at least one of power utilization per processing unit core, power consumption per application running on a processing unit core, number of processing unit core C-states enabled, number of processing unit core P-states enabled, or number of instructions per cycle a processing unit is processing.

12. The system of claim 10, wherein the one or more local processing units comprise at least one of central processing units (CPUs), graphic processing units (GPUs), or field-programmable gate arrays (FPGAs).

13. The system of claim 10, wherein the one or more accelerators comprise application-specific integrated circuits (ASICs).

14. The system of claim 10, wherein the operations further comprise training the machine learning model locally in the same server computing device as the one or more local processing units based on the one or more metrics.

15. The system of claim 10, wherein the operations further comprise receiving the machine learning model, the machine learning model being pretrained externally on a disaggregated service management and orchestration (SMO) platform.

16. The system of claim 10, wherein adjusting the respective states comprises adjusting at least one of frequency, voltage, power, C-states, P-states, or sleep states of the one or more local processing units.

17. The system of claim 10, wherein adjusting the respective states comprises adjusting the one or more states of a group of the one or more local processing units.

18. The system of claim 10, wherein the workload comprises at least one of radio access network (RAN) functions, access and mobility management functions (AMF), user plane functions (UPF), or session management functions (SMF).

19. A non-transitory computer readable medium for storing instructions that, when executed by one or more processors, cause the one or more processors to perform operations for managing one or more local processing units in a server computing device of a distributed cloud platform, the operations comprising:

receiving one or more metrics associated with respective states of the one or more local processing units for performing a workload;

deploying a machine learning model based on the workload on one or more local accelerators in the server computing device containing the one or more local processing units to generate one or more predictions for the respective states of the one or more local processing units;

receiving the one or more predictions from the one or more local accelerators; and adjusting the respective states of the one or more local processing units based on the predictions to perform the workload.

20. The non-transitory computer readable medium of claim 19, wherein the operations further comprise training the machine learning model locally in the same server computing device as the one or more local processing units based on the one or more metrics.

* * * * *